United States Patent
Iwasaki et al.

(10) Patent No.: US 12,474,621 B2
(45) Date of Patent: Nov. 18, 2025

(54) IMAGING DEVICE AND CAMERA

(71) Applicant: AAC Optics Solutions Pte. Ltd., Singapore (SG)

(72) Inventors: Takashi Iwasaki, Osaka (JP); Kazuo Shikama, Osaka (JP)

(73) Assignee: AAC Optics Solutions Pte. Ltd., Singapore (SG)

( * ) Notice: Subject to any disclaimer, the term of this patent is extended or adjusted under 35 U.S.C. 154(b) by 202 days.

(21) Appl. No.: 18/399,842

(22) Filed: Dec. 29, 2023

(65) Prior Publication Data
US 2025/0044664 A1 Feb. 6, 2025

(30) Foreign Application Priority Data
Aug. 1, 2023 (JP) .................................. 2023-125369

(51) Int. Cl.
*G03B 5/00* (2021.01)
*G02B 7/09* (2021.01)
*H04N 23/68* (2023.01)

(52) U.S. Cl.
CPC ................. *G03B 5/00* (2013.01); *G02B 7/09* (2013.01); *G03B 2205/0069* (2013.01); *H04N 23/687* (2023.01)

(58) Field of Classification Search
CPC .............. G03B 5/00; G03B 2205/0069; G03B 2205/00; G02B 27/646; H04N 23/685; H04N 23/687
See application file for complete search history.

(56) References Cited

U.S. PATENT DOCUMENTS

| | | | |
|---|---|---|---|
| 6,295,412 B1 * | 9/2001 | Katano | G03B 5/00 396/448 |
| 2013/0121672 A1 * | 5/2013 | Shikama | G03B 5/02 396/55 |

FOREIGN PATENT DOCUMENTS

| | | | |
|---|---|---|---|
| JP | 2010128389 A | * | 6/2010 |
| JP | 2011242680 A | * | 12/2011 |

* cited by examiner

*Primary Examiner* — Christopher E Mahoney
(74) *Attorney, Agent, or Firm* — Wiersch Law Group (57) ABSTRACT

The present invention relates to an imaging device and a camera. The imaging device includes an autofocus lens module with an optical axis, an imaging module, and an anti-vibration mechanism. The anti-vibration mechanism includes, from an image side to an object side in sequence: a base with a magnet disposed thereon; a drive frame rotatably disposed on the base, a rotation axis of the drive frame being perpendicular to the optical axis, a locking mechanism and a drive coil being disposed on opposite sides of the rotation axis; a movable frame with the imaging module fixedly disposed thereon, the movable frame driving the imaging module to move together relative to the optical axis to achieve anti-shake, and a cooperating mechanism corresponding to the locking mechanism being disposed on the movable frame. Such imaging device and camera can reduce assembly difficulty and avoid wear and indentation caused by drop impact.

10 Claims, 10 Drawing Sheets

IMAGING DEVICE AND CAMERA

CROSS REFERENCE TO RELATED APPLICATIONS

This application claims the benefit of priority under the Paris Convention to Japanese Patent Application No. JP2023-125369, filed Aug. 1, 2023, which is incorporated by reference herein in its entirety.

TECHNICAL FIELD

The present disclosure relates to the field of optical technologies, and more particularly, to an imaging device and a camera.

BACKGROUND

With the rapid development of photography technology, the camera devices with lens driving device are applied to various portable electronic devices, especially, such as mobile phones, tablet computers, which are widely accepted by consumers.

The lens driving device equipped in portable electronic devices usually includes a focusing mechanism for adjusting the focus in the optical axis direction, and an anti-vibration mechanism for adjusting the lens in the orthogonal plane of the optical axis. The focusing mechanism and the anti-vibration mechanism are usually in integrated design and implemented by electromagnetic drive of coils and magnets. Generally, the coil is fixed on the outer periphery of the lens holder. When the coil is energized and subjected to the magnetic force of the magnet, the lens holder fixed with the coil can drive the lens to move along the optical axis direction of the lens under the action of the magnetic force to achieve focusing. When users hold the portable electronic devices for shooting, the lens shake caused by hand shake can be corrected by moving the lens along the direction perpendicular to the optical axis by the lens holder driving the lens.

Since the focusing mechanism and the anti-vibration mechanism are integrated, during assembly, it is necessary to suppress the inherent vibration of the two mechanisms and consider the centering adjustment of the lens, which makes the assembly more difficult. Moreover, since the focusing mechanism and the anti-vibration mechanism can drive the lens to move in three dimensions, it inevitably brings the problem of drop impact. Since the anti-vibration mechanism usually does not work during drop impact, the entire mechanism is prone to wear or indentation after being subjected to impact, which subsequently leads to damage to the anti-shake function.

Therefore, it is necessary to provide an imaging device and a camera to solve the above problems.

SUMMARY

The objective of the present disclosure is to provide an imaging device and a camera to reduce assembly difficulty and avoid wear and indentation caused by drop impact, which leads to damage to the anti-shake function.

Implementation of the technical solutions of the present disclosure:

In order to implement the above-mentioned objective, the present disclosure provides an imaging device, including an autofocus lens module with an optical axis, an imaging module for imaging in coordination with the autofocus lens module, and an anti-vibration mechanism for preventing vibration, wherein the anti-vibration mechanism includes, from an image side to an object side in sequence:

a base, with a magnet disposed thereon;

a drive frame rotatably disposed on the base, a rotation axis of the drive frame being perpendicular to the optical axis, a locking mechanism being disposed on one side of the rotation axis, and a drive coil and a locking yoke being disposed on the other side of the rotation axis; and a movable frame, with the imaging module fixedly disposed thereon, the movable frame driving the imaging module to move together relative to the optical axis to achieve anti-shake, and a cooperating mechanism corresponding to the locking mechanism being disposed on the movable frame;

when the drive coil is not energized, the magnet attracts the locking yoke, causing the drive frame to press against the base, and the locking mechanism and the cooperating mechanism to approach and engage each other, thereby locking the movable frame and the drive frame together;

when the drive coil is energized to generate a magnetic field, the magnet drives the drive frame to rotate via the drive coil, causing the locking mechanism and the cooperating mechanism to move away from each other and disengage, thereby unlocking the movable frame and the drive frame.

As an improvement, the locking mechanism includes a locking hole, the cooperating mechanism includes a locking pin, the locking pin approaches and extends into the locking hole to achieve engagement and lock the movable frame and the drive frame together, and the locking pin exits and moves away from the locking hole to disengage and unlock the movable frame and the drive frame.

As an improvement, the locking mechanism includes a locking pin, the cooperating mechanism includes a locking hole, the locking pin approaches and extends into the locking hole to achieve engagement and lock the movable frame and the drive frame together, and the locking pin exits and moves away from the locking hole to disengage and unlock the movable frame and the drive frame.

As an improvement, the drive frame includes a proximal end portion adjacent to the optical axis and a distal end portion remote from the optical axis, the distal end portion includes an installation space recessed from the image side towards the object side, an opening of the installation space faces the base and accommodates the drive coil therein, the proximal end portion comprises a receiving space recessed from the object side towards the image side, and the receiving space faces the movable frame and accommodates the locking yoke.

As an improvement, the locking mechanism includes at least two locking pins.

As an improvement, the at least two locking pins are sequentially disposed at intervals along a direction parallel to the rotation axis in an edge area of the proximal end portion close to the optical axis, and the at least two locking pins extend from the proximal end portion along a direction parallel to the optical axis towards the movable frame and extend into the locking hole.

As an improvement, the base includes a support rod extending towards the drive frame along a direction parallel to the optical axis, and the drive frame is rotatably disposed at the protruding end of the support rod.

As an improvement, the drive frame includes a receiving slot corresponding to the support rod, the protruding end of the support rod extends into the receiving slot and supports the drive frame, and the drive frame is rotatably disposed on the base around the protruding end of the support rod.

As an improvement, the protruding end of the support rod is a spherical convex surface, and the bottom surface of the receiving slot is a spherical concave surface.

The present disclosure also provides a camera including a camera body, and the above mentioned imaging device.

The present disclosure has the beneficial effects as follows. The driving coil and the locking mechanism are respectively disposed on the rotatable drive frame, and the cooperating mechanism which matches the locking mechanism is disposed on the movable frame. When the driving coil is in a non-energized working state, the magnet exerts an attractive force on the locking yoke, causing the drive frame to press against the base, and the locking mechanism and the cooperating mechanism approach and cooperate to lock the movable frame and the drive frame together. When the driving coil is in an energized working state, the magnet exerts an electromagnetic force on the driving coil, driving the drive frame to rotate, the locking mechanism and the cooperating mechanism move away from each other and release the lock, thereby unlocking the movable frame and the drive frame. In this way, the locking and unlocking of the movable frame and the drive frame can be achieved by the energization of the driving coil, which not only facilitates the suppressing of the inherent vibrations of the anti-shake structure during the assembly process, thereby reducing the design and assembly difficulty, but also avoids the entire mechanism from being impacted and generating wear and indentations by the locking of the movable frame and the drive frame during a drop impact, thereby preventing damage to the anti-shake function.

SYMBOL DESCRIPTION

100: Autofocus lens module
10A: First housing
10B: Base
11: Lens
12: Lens holder
13: Upper leaf spring
14: Lower leaf spring
15: Auto-focus drive coil
16: Drive magnet
17: First flexible circuit board
18A: Position detecting element
18B: Position detecting magnet
19: First vibration-proof gel
200: Imaging module
300: Anti-vibration mechanism
31: Base
310: Support rod
32: Magnet
33: Drive frame
330: Receiving slot
331: Locking drive coil
332: Locking mechanism
333: Proximal part
3330: Receiving space
334: Distal end portion
3340: Installation space
34: Movable frame
340: Anti-vibration yoke
341: Locking yoke
342: Matching mechanism
35: Second housing
36: Drive module
360: Drive substrate
361: Vibration-proof coil
362: Position detecting element
363: Bearing plate
37: Support member
370: Support plate
38: Second flexible circuit board
39: Second vibration-proof gel
400: Periscope optical mechanism
500: Aperture mechanism
600: Device main body

DETAILED DESCRIPTION

The following provides a detailed description of the implementation details of the imaging device, camera, and electronic device provided by the present disclosure. The following content is only implementation details provided for ease of understanding, and is not essential for implementing this solution.

Figure 1:
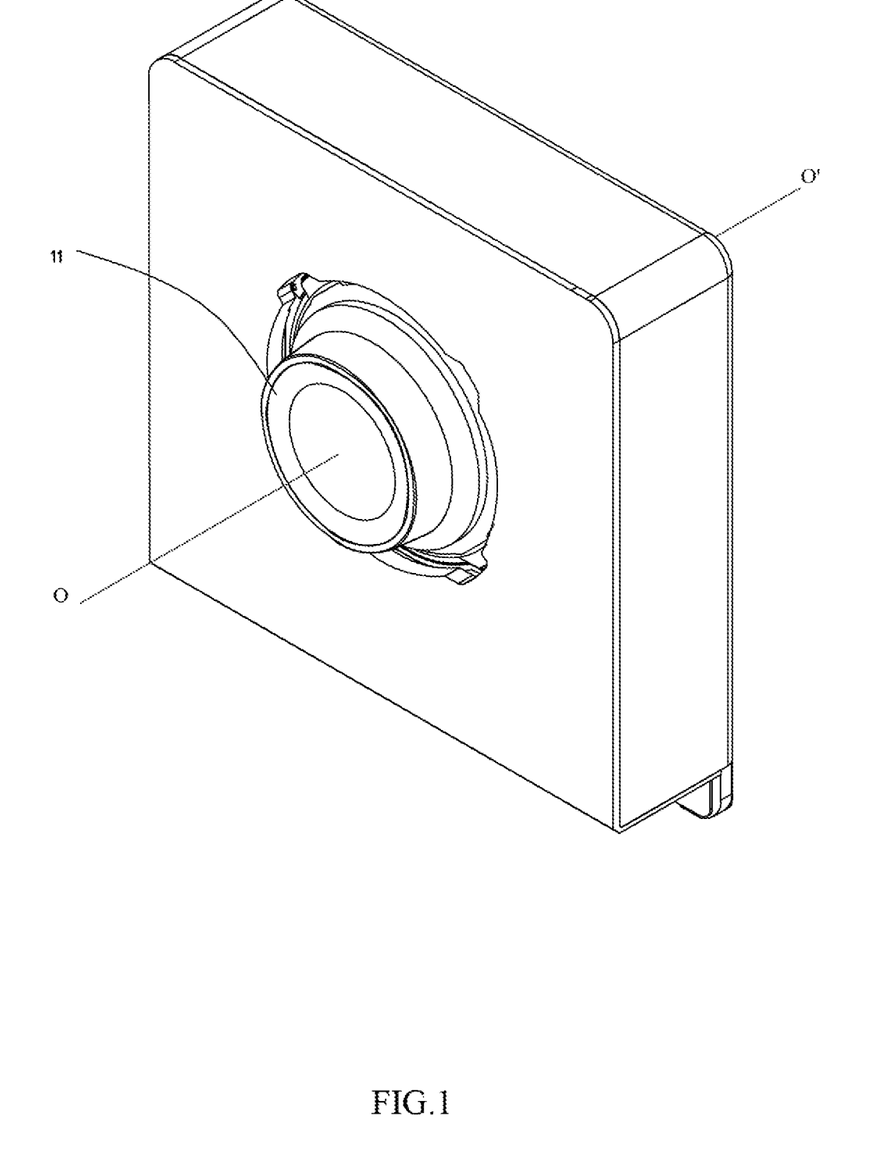
FIG. 1 is a schematic view of an imaging device provided by an embodiment of the present disclosure.
Figure 2:
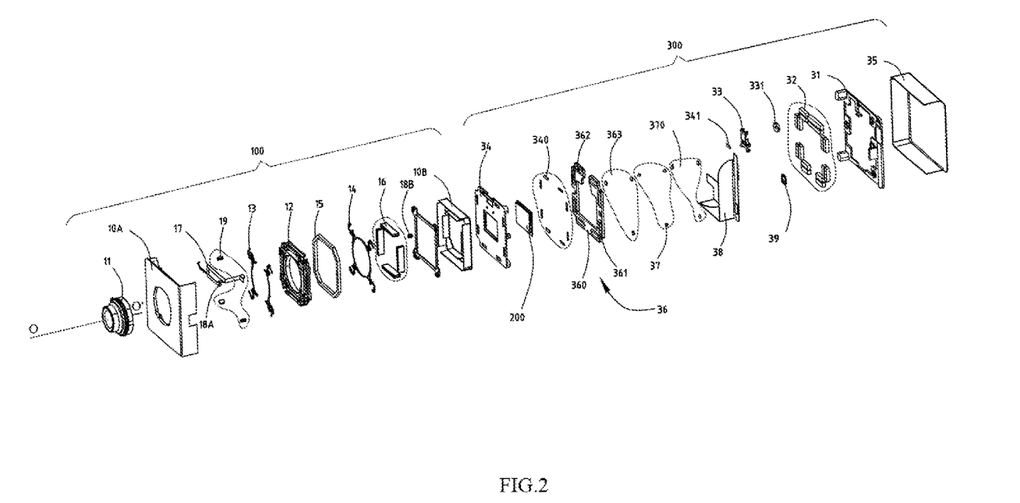
FIG. 2 is an exploded view of the imaging device provided by an embodiment of the present disclosure.

Referring to FIGS. 1 to 2, the first embodiment of the present disclosure relates to an imaging device including an autofocus lens module 100 with an optical axis OO', an imaging module 200 for imaging in coordination with the autofocus lens module 100, and an anti-vibration mechanism 300 for preventing vibration.

Figure 3:
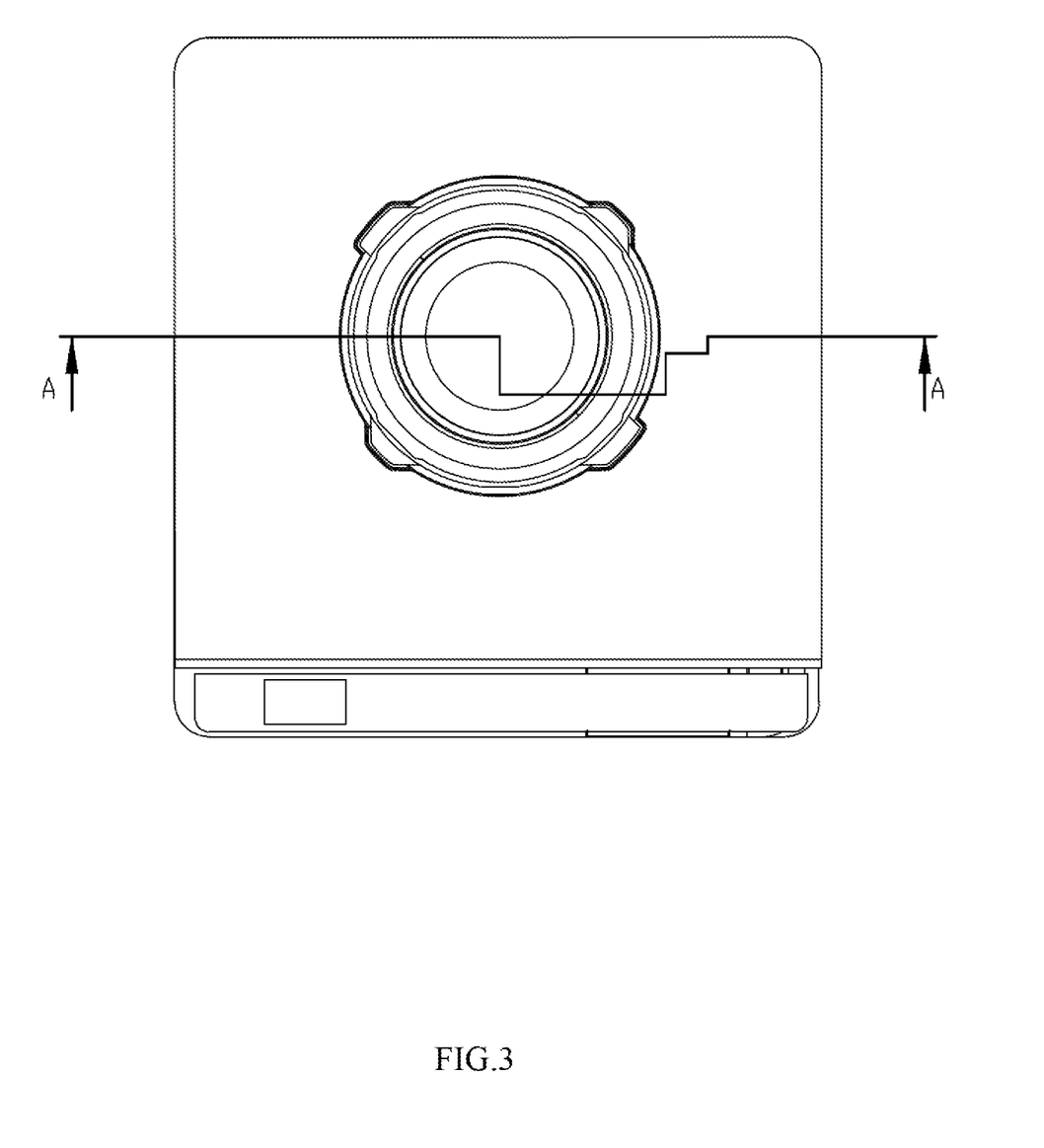
FIG. 3 is a top view of the imaging device provided by an embodiment of the present disclosure.

The anti-vibration mechanism 300 includes, from an image side to an object side in sequence: a base 31, a magnet 32 disposed on the base 31, a drive frame 33 rotatably disposed on the base 31, and a movable frame 34. A rotation axis of the drive frame is perpendicular to the optical axis OO'. Please also referring to FIG. 3 and FIG. 4, a drive coil 331 and a locking yoke 341 being disposed on one side of the rotation axis of the drive frame, a locking mechanism 332 is disposed on the other side of the rotation axis of the drive frame. The imaging module 200 is fixedly disposed on the movable frame 34. The movable frame 34 drives the imaging module 200 to move together relative to the optical axis OO' to achieve anti-shake. A cooperating mechanism 342 corresponding to the locking mechanism 332 is disposed on the movable frame 34. When the drive coil 331 is not energized, the magnet 32 attracts the locking yoke 341, causing the drive frame 33 to press against the base 31, and the locking mechanism 332 and the cooperating mechanism 342 to approach and engage each other, thereby locking the movable frame 34 and the drive frame 33 together. When the drive coil 331 is energized to generate a magnetic field, the magnet 32 drives the drive frame 33 to rotate via the drive coil 331, causing the locking mechanism 332 and the cooperating mechanism 342 to move away from each other and disengage, thereby unlocking the movable frame 34 and the drive frame 33.

The embodiment of the present disclosure sets a locking driving coil 331 and a locking mechanism 332 on the rotatable drive frame 33 respectively, and sets a cooperating mechanism 342 on the movable frame 34 fixed with the imaging module 200. As such, when the locking driving coil 331 is not powered on, the magnet 32 generates an attractive force to the locking yoke 341, thereby causing the drive frame 33 to press against the base 31, the locking mechanism 332 and the cooperating mechanism 342 to approach and cooperate with each other, thereby locking the movable frame 34 and the drive frame 33 together; when the locking driving coil 331 is powered on, the magnet 32 generates an electromagnetic force to drive the drive frame 33 to rotate, the locking mechanism 332 and the cooperating mechanism 342 move away from each other and release the cooperation, thereby unlocking the movable frame 34 and the drive frame 33. In this way, the locking and unlocking of the movable frame 34 and the drive frame 33 can be achieved simply by whether the locking driving coil 331 is powered on or not. This not only facilitates the suppression of the inherent vibration of the anti-shake structure during the assembly process, thereby reducing the design and assembly difficulty, but also avoids wear and indentation of the entire mechanism caused by the locking of the movable frame 34 and the drive frame 33 during a drop impact, thereby avoiding damage to the anti-shake function.

Specifically, the auto-focus lens module 100 includes a first housing 10A, a base 10B, a lens 11, a lens holder 12, an upper leaf spring 13, a lower leaf spring 14, an auto-focus drive coil 15, and a drive magnet 16, as shown in FIG. 2.

The first housing 10A and the base 10B cooperatively form a receiving space for accommodating other components of the auto-focus lens module 100. The lens 11, with an optical axis OO', is configured for converging light rays for the imaging module 200. The lens holder 12 is disposed in the housing 10, thereby carrying and fixing the lens 11. The lens holder 12 is fixed to the first housing 10A and the base 10B respectively by the upper leaf spring 13 and the lower leaf spring 14. The lens holder 12 is movable in the direction of the optical axis OO' so that the upper leaf spring 13 and the lower leaf spring 14 can elastically keep the lens holder 12 in an initial position without the action of electromagnetic force. An auto-focus drive coil 15 is wound on the lens holder 12, and a drive magnet 16 is disposed on the base 10B. So that, when the auto-focus drive coil 15 is powered on, the drive magnet 16 can generate magnetic force to drive the lens holder 12 to move together with the lens 11 in the direction of the optical axis OO', thereby achieving auto-focus.

It can be understood that, in order to control the auto-focus by energizing and de-energizing the auto-focus drive coil 15, the auto-focus lens module 100 further includes a first flexible circuit board 17. The auto-focus drive coil 15 is electrically connected to a servo control device (which can be disposed on the first flexible circuit board 17) via the first flexible circuit board 17, so as to be energized and de-energized under the control of the servo control device to achieve auto-focus.

Preferably, in order to detect the position of the lens 11 during the auto-focus process, the auto-focus lens module 100 further includes a position detecting element 18A and a position detecting magnet 18B. Specifically, the position detecting element 18A is disposed on the first flexible circuit board 17, and the position detecting magnet 18B is disposed on the lens holder 12, so that the position detecting element 18A can detect the magnetic flux of the position detecting magnet 18B to determine the precise position of the lens holder 12, and then send the position to the servo control device to achieve the position detection function of the lens 11.

In addition, in a feasible embodiment, the lens holder 12 can also be coated with a first vibration-proof gel 19, which can buffer and control the vibration effect of the lens holder 12 when the auto-focus drive coil 15 is suddenly powered on, thereby achieving a shock-absorbing effect and achieving more accurate auto-focus function.

The imaging module 200 can be an image sensor. Light beam passing through the lens 11 along the optical axis OO', will be converged on the imaging module 200 and form an image of the object to be photographed.

The anti-vibration mechanism 300 includes a base 31, a magnet 32, a drive frame 33, and a movable frame 34 sequentially arranged from the image side to the object side.

The base 31 is configured for supporting the magnet 32, so as to apply magnetic force to the drive frame 33 and the movable frame 34 through the magnet 32. Preferably, the anti-vibration mechanism 300 further includes a second housing 35 buckled on the image side of the base 10B, so that the second housing 35 and the base 10B cooperatively form a receiving space for receiving the base 31, the magnet 32, the drive frame 33, and the movable frame 34. The base 31 is arranged on the second housing 35, and a support plate 370 is fixedly disposed on the base 31.

Figure 4:
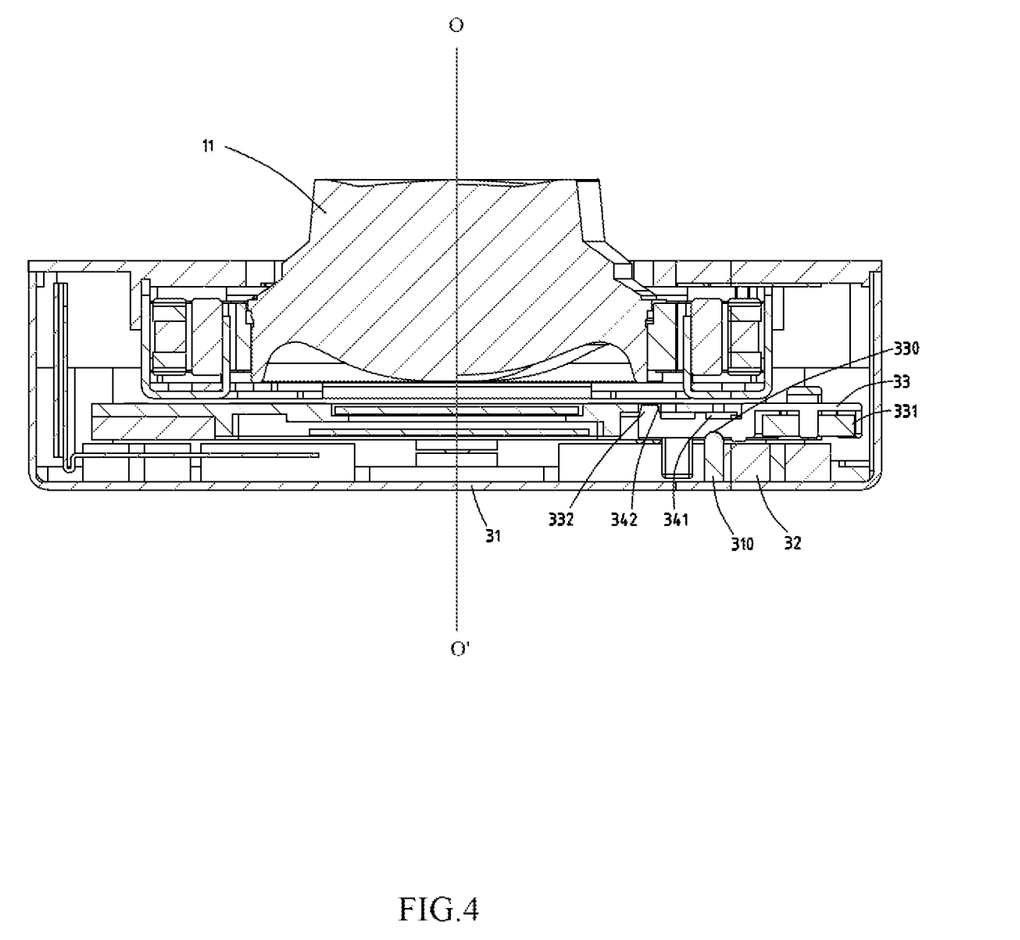
FIG. 4 is a sectional view taken along line AA of FIG. 3.

The drive frame 33 is rotatably disposed on the base 31, and the rotation axis of the drive frame 33 is perpendicular to the optical axis OO'. The drive frame 33 is provided with locking drive coils 331 and a locking mechanism 332 on opposite sides of the rotation axis. Preferably, a support rod 310 is configured extending from the base 31 towards the drive frame 33, along the direction parallel to the optical axis OO' as shown in FIG. 4. The drive frame 33 is rotatably provided on the protruding end of the support rod 310, for example, the drive frame 33 can be pivotally connected to the protruding end of the support rod 310 (that is, the top of the support rod 310 shown in FIG. 4). More preferably, in an embodiment, the drive frame 33 is provided with a receiving slot 330 corresponding to the support rod 310, and the protruding end of the support rod 310 extends into the receiving slot 330 and supports the drive frame 33. Accordingly, the drive frame 33 is rotatably disposed on the base 31 around the protruding end of the support rod 310. Furthermore, the end of the support rod 310 can be designed as a spherical convex surface, and correspondingly, the bottom surface of the receiving slot 330 is a spherical concave surface, so as to reduce the resistance of the rotation of the drive frame 33 and achieve a better rotation effect.

Figure 5:
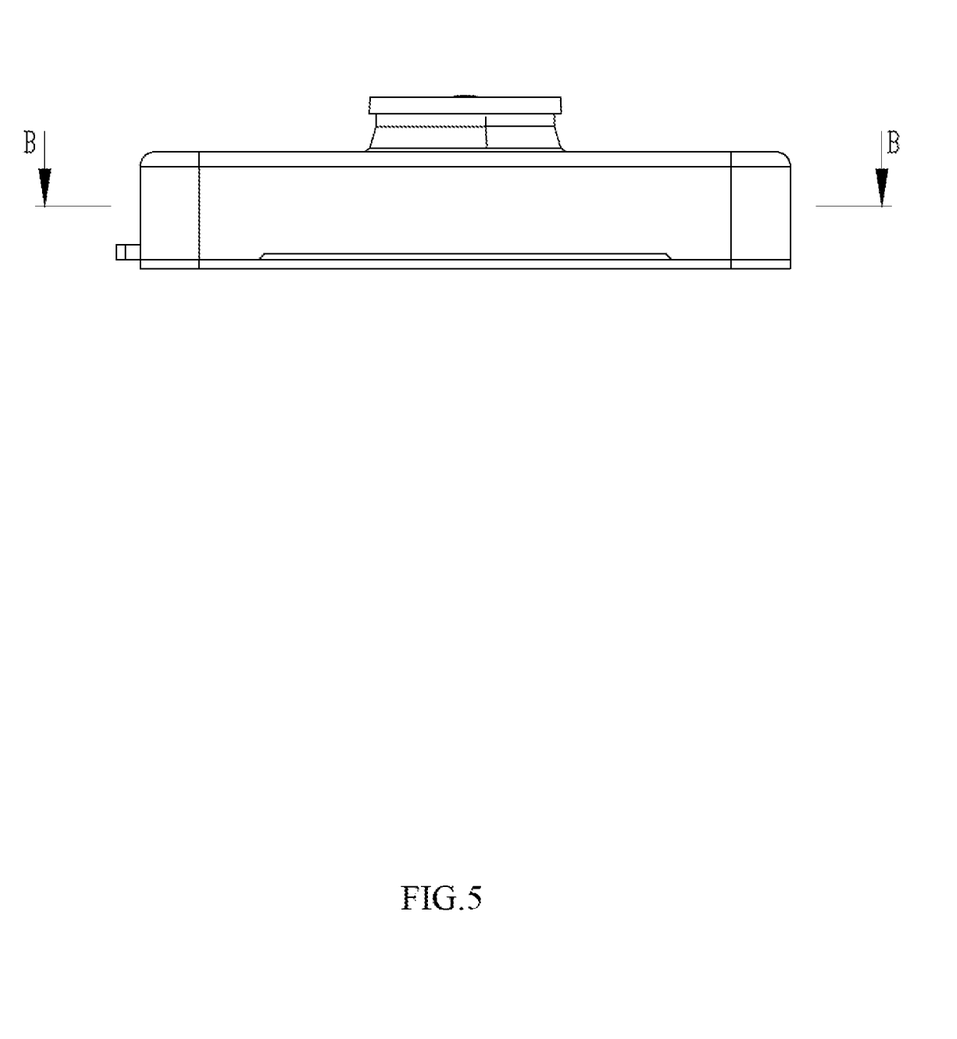
FIG. 5 is a side view of the imaging device provided by an embodiment of the present disclosure.
Figure 6:
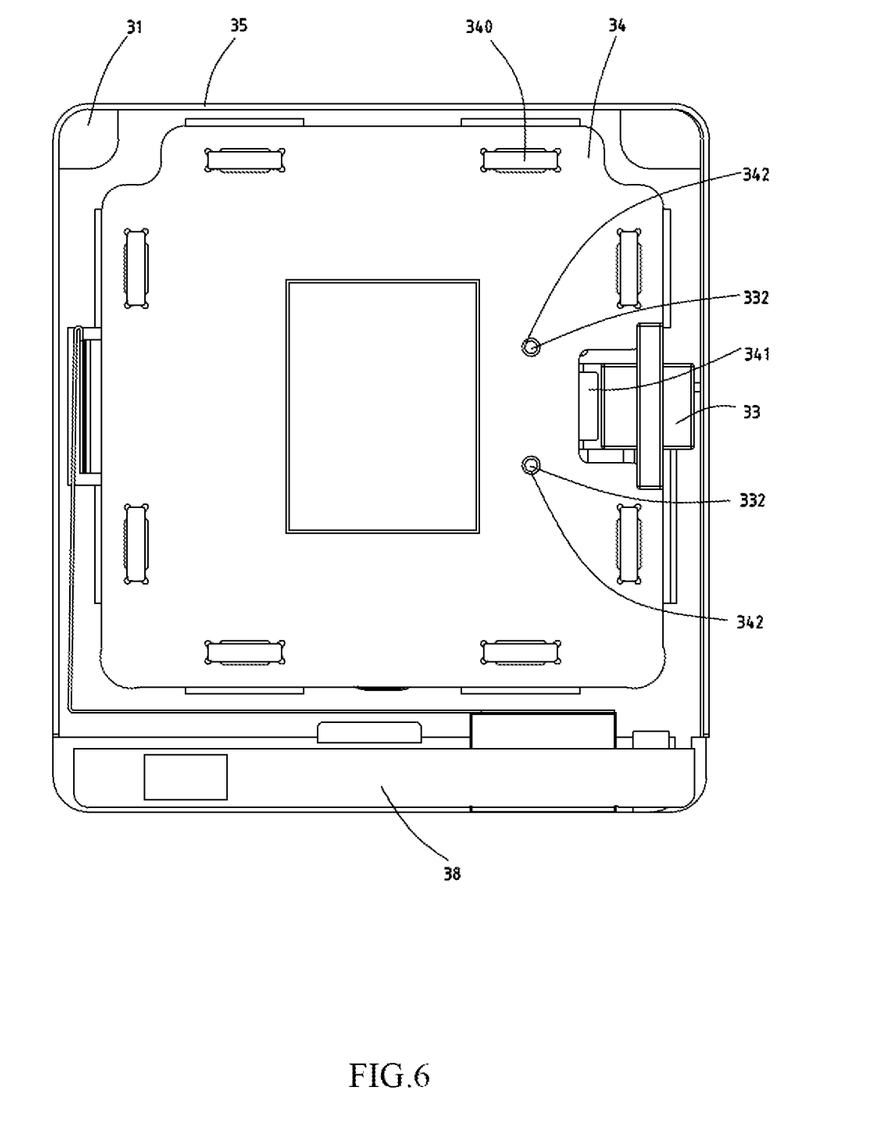
FIG. 6 is a sectional view taken along line BB of FIG. 5.
Figure 7:
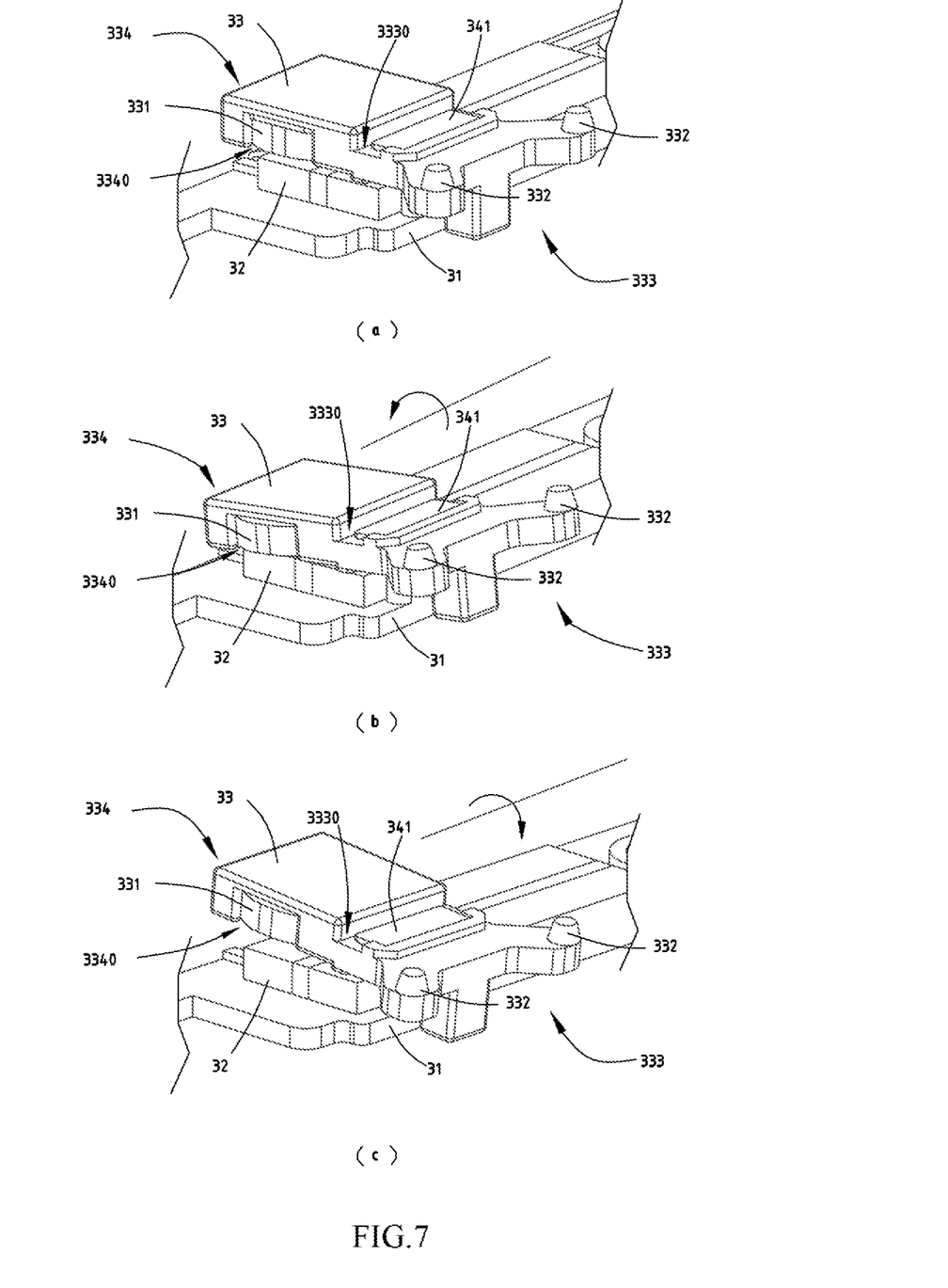
FIG. 7 is a schematic view of the rotation operation of the drive frame of the imaging device provided by an embodiment of the present disclosure.

Please also refer to FIGS. 5, 6, and 7. Furthermore, the drive frame 33 can include a proximal portion 333 adjacent to the optical axis OO' and a distal end portion 334 away from the optical axis OO'. The distal end portion 334 is provided with an installation space 3340 recessed from the image side to the object side, and the opening of the installation space 3340 faces the base 31 and accommodates the locking drive coil 331. The proximal portion 333 is provided with a receiving space 3330 recessed from the object side to the image side. The receiving space 3330 faces the movable frame 34 and receives the locking yoke 341, and the locking drive coil 331 and the locking yoke 341 are located on the same side of the support rod 310 (that is, in the direction perpendicular to the optical axis OO', the locking drive coil 331 is farthest from the optical axis OO', the support rod 310 is closest to the optical axis OO', and the locking yoke 341 is located between the locking drive coil 331 and the support rod 310). FIG. 7(a) shows a partial structural schematic view of the drive frame 33 when it is not rotated, and FIG. 7(b) shows a partial structural schematic view of the drive frame 33 when the magnet 32 attracts the locking drive coil 331, causing the drive frame 33 to rotate along the rotation axis (the dotted line shown in FIG. 7(b)). FIG. 7(c) shows a partial structural schematic view of the drive frame 33 when the magnet 32 repels the locking drive coil 331, causing the drive frame 33 to rotate along the rotation axis (the dotted line shown in FIG. 7(c)).

When the locking coil 331 is not energized, although the magnet 32 does not apply magnetic force to the unenergized locking coil 331, it attracts the locking yoke 341, causing the distal end portion 334 of the drive frame 33 to be subjected to downward force and press down towards the magnet 32, and the proximal end 333 of the drive frame 33 rises under the lever action, thereby driving the locking mechanism 332 to approach the mating mechanism 342 to achieve locking and remain in the state shown in FIG. 7(b).

When the locking coil 331 is energized, the magnet 32 applies an upward repulsive force to the energized locking coil 331, which overcomes the attractive force of the magnet 32 on the locking yoke 341, causing the distal end portion 334 to be subjected to upward force and rise towards the upper part away from the magnet 32, while the proximal end 333 of the drive frame 33 presses down under the lever action, thereby driving the locking mechanism 332 to move away from the mating mechanism 342, first reaching the state shown in FIG. 7(a), and then ultimately reaching the state shown in FIG. 7(c) to achieve unlocking.

In this way, by controlling the energization of the locking drive coil 331, the drive frame 33 is rotated to drive the locking mechanism 332 to move away from the mating mechanism 342 to achieve unlocking.

Please refer again to FIG. 2. The movable frame 34 is for supporting and fixing the imaging module 200. The anti-vibration mechanism 300 further includes a drive module 36 that drives the movable frame 34 to move in a orthogonal plane perpendicular to the optical axis OO' and tilt relative to the optical axis OO' to achieve anti-vibration. In an exemplary embodiment, the drive module 36 includes a drive substrate 360, an vibration-proof coil 361 disposed on the drive substrate 360, a position detecting element 362 disposed on the drive substrate 360, and a bearing plate 363 fixed to the movable frame 34 together with the drive substrate 360. Thus, the movable frame 34 carrying the imaging module 200 and the bearing plate 363 is supported by the support member 37 and is disposed on the support plate 370. So that, the support member 37 can rotate under the action of an external force, allowing the bearing plate 363 on the support member 37 and the support plate 370 to undergo relative rotation, thereby driving the vibration-proof coil 361 on the drive substrate 360 to be subjected to the magnetic force of the magnet 32 when it is energized and can drive the movable frame 34 to move freely in a plane perpendicular to the optical axis OO' to achieve anti-vibration. Correspondingly, the position detecting element 362 on the drive substrate 360 detects the magnetic flux of the magnet 32 for position detection and anti-vibration control.

It can be understood that, in the design and manufacturing process, the surface precision of the bearing plate 363 and the support plate 370 can be ensured to ensure smooth rotation of the support member 37.

It can be understood that the vibration-proof coil 361 can be a plurality of single coil windings or an electrically conductive pattern formed on the drive substrate 360. In an exemplary embodiment, the drive substrate 360 is a flexible substrate. In an exemplary embodiment, the two vibration-proof coils 361 on each side of the drive substrate 360 can be applied currents in opposite directions, so that the movable frame 34 rotates relative to the optical axis OO', preventing the rotation deviation of the lens 11 and achieving four-axis automatic focusing and anti-vibration.

Preferably, in an exemplary embodiment, the vibration-proof coil 361, the position detecting element 362, and the signal line and power line of the imaging module 200 can all be electrically connected through a second flexible circuit board 38 located outside the anti-vibration mechanism 300, thereby avoiding interference with the movement of the anti-vibration mechanism 300. Furthermore, the second flexible circuit board 38 is provided with a curved surface located in the space between the second housing 35 and the first housing 10A, thereby forming a configuration that avoids interfering with the movement of the anti-vibration mechanism 300. It should be noted that, the first flexible circuit board 17 of the auto-focus lens module 100 can also be arranged outside the auto-focus lens module 100, thereby being connected to the second flexible circuit board 38 of the anti-vibration mechanism 300. In this way, the first flexible circuit board 17 for auto-focus can be integrated with the second flexible circuit board 38 for anti-vibration.

The movable frame 34 is provided with a vibration-proof yoke 340 and a mating mechanism 342 opposite to the locking mechanism 332. In a exemplary embodiment, the magnet 32 can attract the anti-vibration yoke 340 towards the optical axis OO' (i.e., the center of the orthogonal plane) in the orthogonal plane of the optical axis OO', and attract the anti-vibration yoke 340 along the optical axis OO', thereby achieving the effect of a magnetic spring and effectively reducing the inclination of the imaging module 200 relative to the optical axis OO'. In addition, the existence of the anti-vibration yoke 340 causes the movable frame 34 to be held on the drive frame 33 by the attractive force of the magnet 32, thereby enabling the bearing plate 363 and the support plate 370 to clamp the support member 37 tightly, avoiding the falling off of the support member 37, and avoiding magnetic leakage.

When the locking drive coil 331 is not energized, the magnet 32 attracts the locking yoke 341 to press the drive frame 33 against the base 31, causing the locking mechanism 332 to approach and mate with the mating mechanism 342, thereby locking the movable frame 34 and the drive frame 33 together. In this state, the position of the movable frame 34 causes the optical axis OO' to pass through the center of the imaging module 200.

When the locking drive coil 331 is energized to generate a magnetic field, the magnet 32 drives the drive frame 33 to rotate via the locking drive coil 331, causing the locking mechanism 332 to move away from and disengage the mating mechanism 342, thereby unlocking the movable frame 34 and the drive frame 33.

Specifically, in an exemplary embodiment, the locking mechanism 332 is a locking pin, and the mating mechanism 342 is a locking hole. The locking pin approaches and extends into the locking hole to achieve engagement and lock the movable frame 34 and the drive frame 33 together.

The locking pin exits and moves away from the locking hole to disengage and unlock the movable frame 34 and the drive frame 33.

More specifically, when perform unlock operation, the power supply to the locking drive coil 331 can be controlled to cause the magnet 32 to apply an upward repulsive force to the energized locking drive coil 331, thereby driving the drive frame 33 to rotate about the end of the support rod 310 (i.e., the top end as shown in FIG. 4) as the rotation axis (a straight line perpendicular to the plane of the figure/paper and passing through the end of the support rod 310), thus causing the remote end portion 334 of the drive frame 33 to move upward and the proximal end portion 333 to move downward, resulting in the locking pin located at the proximal end portion 333 moving away from the locking hole and unlocking the drive frame 33 from the movable frame 34. In this way, when the anti-vibration mechanism 300 is not in operation and an external impact is caused by a drop, the imaging device can obtain information through components such as a gyroscope (usually used as a posture and acceleration detection element), and then achieve locking of the drive frame 33 and the movable frame 34 at the moment of a drop, protecting the anti-vibration mechanism 300 from impact and avoiding wear and indentation caused by drop impact, resulting in damage to the anti-vibration function. In addition, during the assembly process of the imaging device, centering adjustment can be achieved by locking of the drive frame 33 and the movable frame 34 without the need for large-scale fixtures, thereby reducing assembly difficulty.

It can be understood that, the specific forms of the locking mechanism 332 and the mating mechanism 342 can also be swapped. The locking mechanism 332 can be set as a locking hole and the mating mechanism 342 can be set as a locking pin. In addition, the number of locking pins can be one, two, or more. Preferably, the number of locking pins is two or more. In an exemplary embodiment, two or more locking pins are sequentially arranged along a direction parallel to the rotation axis of the drive frame 33 at intervals from the proximal end portion 333 close to the optical axis OO' on the edge region of the proximal end portion 333, and each locking pin extends from the proximal end portion 333 along a direction parallel to the optical axis OO' towards the movable frame 34 and extends into the locking hole.

Preferably, in an exemplary embodiment, the anti-vibration mechanism 300 further includes a second vibration-proof gel 39 disposed between the movable member and the fixed member, which can buffer and control the vibration effect of the movable frame 34 when the vibration-proof coil 361 is suddenly energized, thereby providing shock absorption and achieving more precise anti-vibration functions. Of course, the second vibration-proof gel 39 can also be replaced by lubricating oil, a dust collector, or other adhesives.

It should be noted that, the imaging module 200 can include an image sensor and an infrared cutoff filter, and the movable frame 34 and the imaging module 200 can form an integrated structure. When used in combination with the drive frame 33, it can achieve locking and unlocking functions to improve structural rigidity and enhance drop protection, while also reducing the number of components of the imaging module 200 and improving the perpendicularity of the imaging module 200 with respect to the optical axis OO', avoiding inclination, and providing beneficial assistance for miniaturization and low-profile design, achieving both improved assembly and anti-vibration performance.

Figure 8:
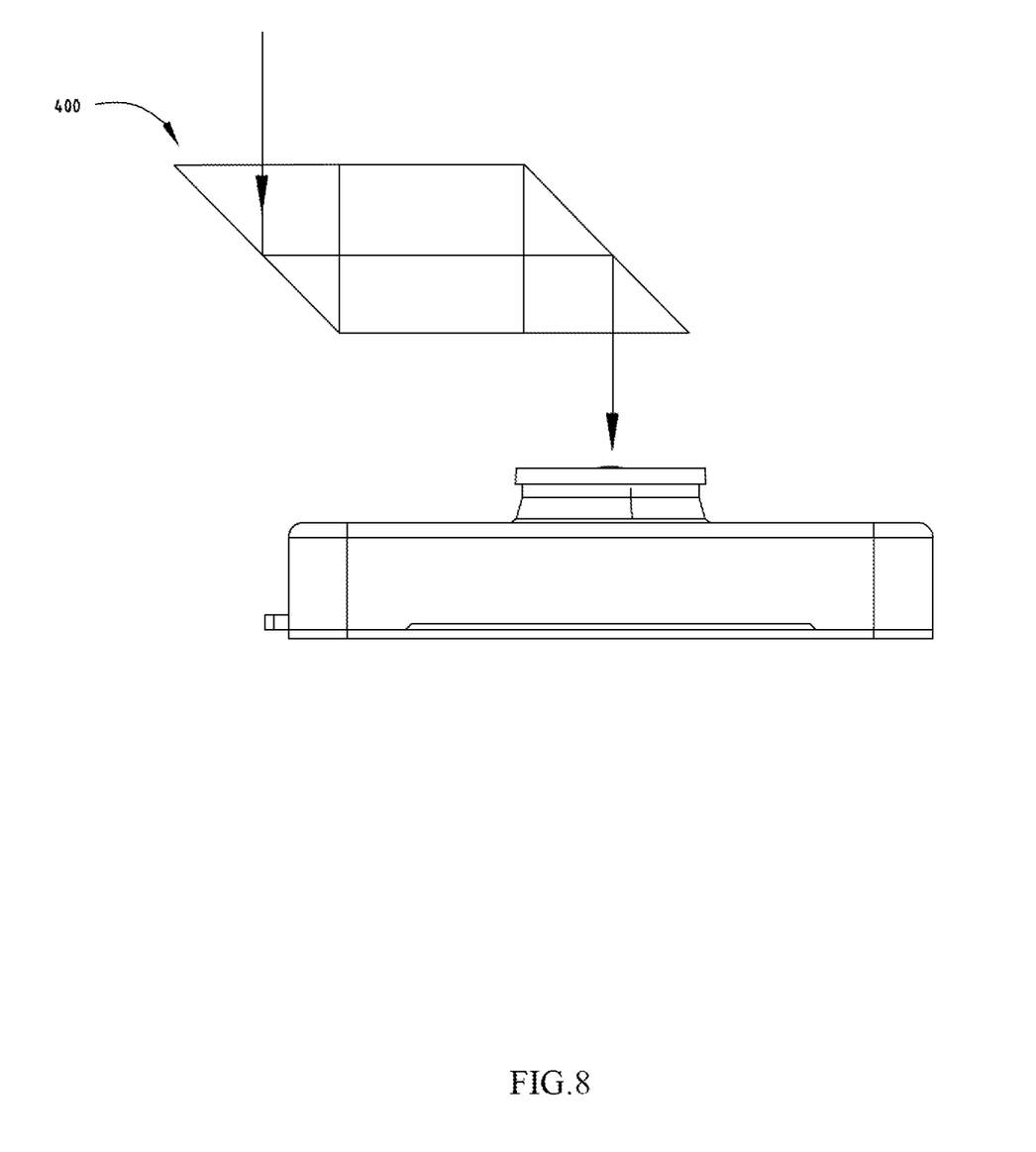
FIG. 8 is a schematic view of an imaging system provided by an embodiment of the present disclosure.

The embodiment of the present disclosure relates to an imaging system, including the above-described imaging device. Such an imaging system can have a sunken zoom mechanism or a periscope light path structure. For example, as shown in FIG. 8, an imaging system according to an embodiment of the present disclosure includes: a periscope optical mechanism 400 and the above-described imaging device.

By disposing the imaging device of the above embodiment on the periscope optical mechanism 400, the locking and contact of the movable frame and the drive frame can be achieved simply by energizing or not energizing the drive coil, which not only facilitates suppressing the inherent vibration of the anti-vibration structure during the assembly process, thereby reducing the design and assembly difficulty, but also avoids the entire mechanism from being impacted and generating wear and indentation during drop impact by locking the movable frame and the drive frame, thereby avoiding damage to the anti-vibration function.

Figure 9:
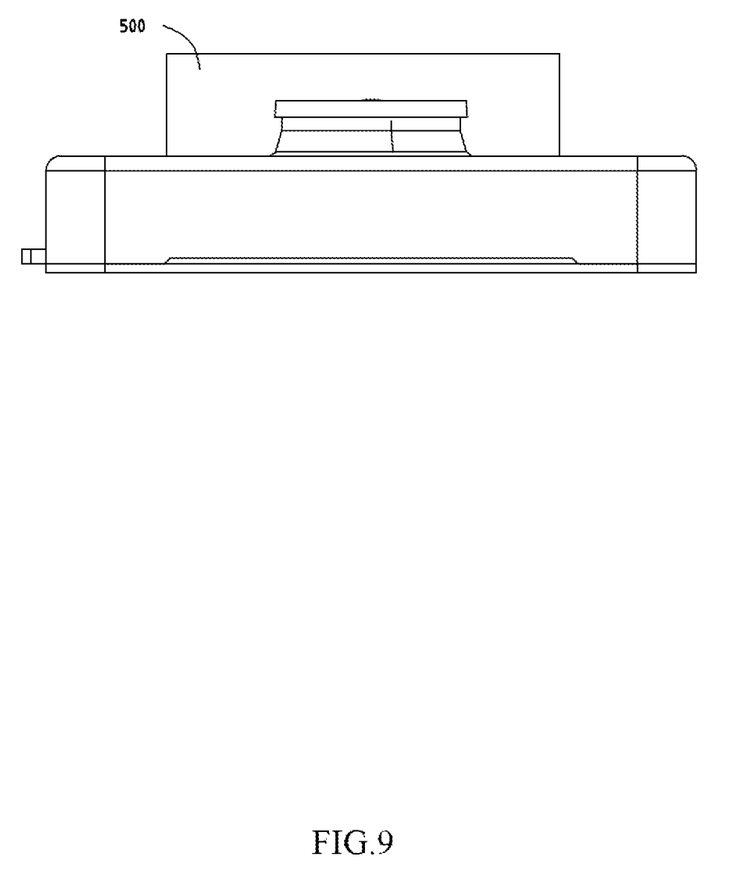
FIG. 9 is a schematic view of a camera provided by an embodiment of the present disclosure.

The embodiment of the present disclosure further relates to a camera, as shown in FIG. 9, including: an aperture mechanism 500 on a camera main body (not labeled in FIG. 9) and the above-described imaging device (not labeled in FIG. 9).

By disposing the imaging device of the above embodiment that cooperates with the aperture mechanism 500 in the camera, the locking and contact of the movable frame and the drive frame can be achieved simply by energizing or not energizing the drive coil, which not only facilitates suppressing the inherent vibration of the anti-vibration structure during the assembly process, thereby reducing the design and assembly difficulty, but also avoids the entire mechanism from being impacted and generating wear and indentation during drop impact by locking the movable frame and the drive frame, thereby avoiding damage to the anti-vibration function.

It can be understood that the aforementioned imaging device, imaging system, and camera can be applied to various electronic devices with photographing functions, such as mobile phones, tablet computers, smart watches, and other portable terminals, as well as notebook computers or other terminals.

Figure 10:
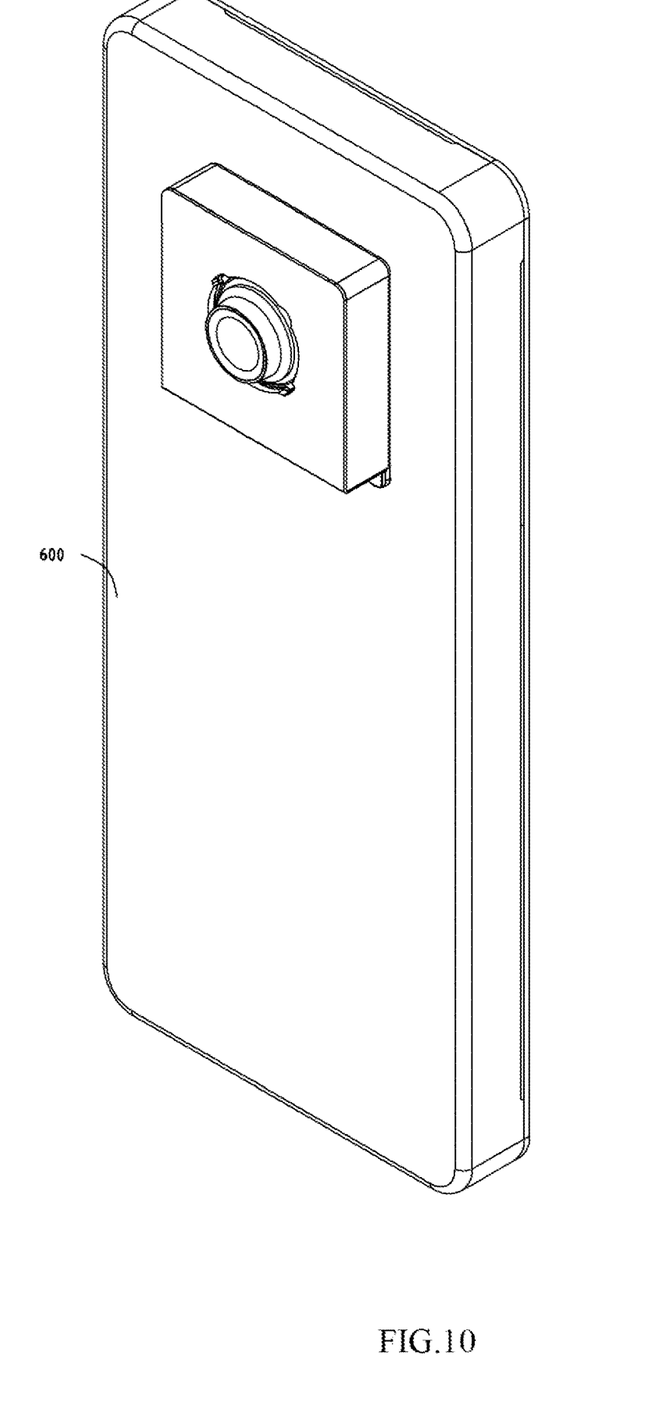
FIG. 10 is a schematic view of an electronic device provided by an embodiment of the present disclosure.

The embodiment of the present disclosure further relates to an electronic device with a photographing function, as shown in FIG. 10, including: a device main body 600 and the above-described imaging device disposed on the device main body 600.

By disposing the imaging device of the above embodiment on the electronic device, the locking and contact of the movable frame and the drive frame can be achieved simply by energizing or not energizing the drive coil, which not only facilitates suppressing the inherent vibration of the anti-vibration structure during the assembly process, thereby reducing the design and assembly difficulty, but also avoids the entire mechanism from being impacted and generating wear and indentation during drop impact by locking the movable frame and the drive frame, thereby avoiding damage to the anti-vibration function.

Those of ordinary skill in the art will understand that the above various embodiments are merely specific embodiments for implementing the present disclosure, and in practical applications, various changes can be made in form and detail without departing from the spirit and scope of the present invention.

What is claimed is:

1. An imaging device, comprising an autofocus lens module with an optical axis, an imaging module for imaging in coordination with the autofocus lens module, and an anti-vibration mechanism for preventing vibration, wherein the anti-vibration mechanism comprises, from an image side to an object side in sequence:

a base, with a magnet disposed thereon;

a drive frame rotatably disposed on the base, a rotation axis of the drive frame being perpendicular to the optical axis, a locking mechanism being disposed on one side of the rotation axis, and a drive coil and a locking yoke being disposed on the other side of the rotation axis; and a movable frame, with the imaging module fixedly disposed thereon, the movable frame driving the imaging module to move together relative to the optical axis to achieve anti-shake, and a cooperating mechanism corresponding to the locking mechanism being disposed on the movable frame;

when the drive coil is not energized, the magnet attracts the locking yoke, causing the drive frame to press against the base, and the locking mechanism and the cooperating mechanism to approach and engage each other, thereby locking the movable frame and the drive frame together;

when the drive coil is energized to generate a magnetic field, the magnet drives the drive frame to rotate via the drive coil, causing the locking mechanism and the cooperating mechanism to move away from each other and disengage, thereby unlocking the movable frame and the drive frame.

2. The imaging device according to claim 1, wherein the locking mechanism comprises a locking hole, the cooperating mechanism comprises a locking pin, the locking pin approaches and extends into the locking hole to achieve engagement and lock the movable frame and the drive frame together, and the locking pin exits and moves away from the locking hole to disengage and unlock the movable frame and the drive frame.

3. The imaging device according to claim 1, wherein the locking mechanism comprises a locking pin, the cooperating mechanism comprises a locking hole, the locking pin approaches and extends into the locking hole to achieve engagement and lock the movable frame and the drive frame together, and the locking pin exits and moves away from the locking hole to disengage and unlock the movable frame and the drive frame.

4. The imaging device according to claim 3, wherein the drive frame includes a proximal end portion adjacent to the optical axis and a distal end portion remote from the optical axis, the distal end portion comprises an installation space recessed from the image side towards the object side, an opening of the installation space faces the base and accommodates the drive coil therein, the proximal end portion comprises a receiving space recessed from the object side towards the image side, and the receiving space faces the movable frame and accommodates the locking yoke.

5. The imaging device according to claim 4, wherein the locking mechanism comprises at least two locking pins.

6. The imaging device according to claim 5, wherein the at least two locking pins are sequentially disposed at intervals along a direction parallel to the rotation axis in an edge area of the proximal end portion close to the optical axis, and the at least two locking pins extend from the proximal end portion along a direction parallel to the optical axis towards the movable frame and extend into the locking hole.

7. The imaging device according to claim 1, wherein the base comprises a support rod extending towards the drive frame along a direction parallel to the optical axis, and the drive frame is rotatably disposed at the protruding end of the support rod.

8. The imaging device according to claim 7, wherein the drive frame comprises a receiving slot corresponding to the support rod, the protruding end of the support rod extends into the receiving slot and supports the drive frame, and the drive frame is rotatably disposed on the base around the protruding end of the support rod.

9. The imaging device according to claim 8, wherein the protruding end of the support rod is a spherical convex surface and the bottom surface of the receiving slot is a spherical concave surface.

10. A camera, comprising a camera body, and an imaging device as claimed in claim 1.

* * * * *